(12) United States Patent
Bshara et al.

(10) Patent No.: US 10,282,502 B1
(45) Date of Patent: May 7, 2019

(54) FLEXIBLE CONSTRAINT INTEGRATED CIRCUIT IMPLEMENTATION RUNS

(71) Applicant: Amazon Technologies, Inc., Seattle, WA (US)

(72) Inventors: Nafea Bshara, San Jose, CA (US);
Islam Mohamed Hatem Abdulfattah Mohamed Atta, Vancouver (CA);
Prateek Tandon, Issaquah, WA (US);
Asif Khan, Cedar Park, TX (US);
Kiran Kalkunte Seshadri, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/452,605

(22) Filed: Mar. 7, 2017

(51) Int. Cl.
*G06F 17/50* (2006.01)

(52) U.S. Cl.
CPC ........ *G06F 17/5054* (2013.01); *G06F 17/505* (2013.01); *G06F 2217/06* (2013.01)

(58) Field of Classification Search
CPC .................................................. G06F 17/5054
USPC ........................................................ 716/102
See application file for complete search history.

(56) References Cited

U.S. PATENT DOCUMENTS

| | | | |
|---|---|---|---|
| 5,692,193 A * | 11/1997 | Jagannathan | G06F 8/451 711/6 |
| 5,802,349 A * | 9/1998 | Rigg | G06F 17/5045 716/103 |
| 6,742,165 B2 * | 5/2004 | Lev | G06F 17/5045 716/102 |
| 7,802,221 B1 * | 9/2010 | Brink | G06F 17/5045 716/121 |
| 8,346,704 B2 * | 1/2013 | Hamadi | G06N 5/04 706/47 |
| 2002/0073380 A1 * | 6/2002 | Cooke | G06F 17/5045 716/102 |
| 2005/0010598 A1 * | 1/2005 | Shankar | G06Q 10/06 |
| 2008/0263486 A1 * | 10/2008 | Alexanian | G01R 31/318314 716/106 |

* cited by examiner

*Primary Examiner* — Suresh Memula
(74) *Attorney, Agent, or Firm* — Klarquist Sparkman, LLP

(57) ABSTRACT

Technologies are provided for automatically performing multiple integrated circuit implementation runs with variations of input design constraints. Input design constraints can be automatically adjusted to create multiple modified versions of the design constraints. The multiple modified design constraints can be used to perform separate integrated circuit implementation runs for a given circuit design. Results of the multiple implementation runs can be analyzed, and a circuit implementation report can be generated based on the results of the runs performed with the various modified design constraints. In some embodiments, a circuit implementation recommendation can be generated based on the implementation run results. In at least some scenarios, the multiple implementation runs can be performed using multiple synthesis and implementation processes. The multiple synthesis and implementation processes can be distributed across one or more host computing devices.

20 Claims, 8 Drawing Sheets

FLEXIBLE CONSTRAINT INTEGRATED CIRCUIT IMPLEMENTATION RUNS

BACKGROUND

Integrated circuit designers can create logical representations of integrated circuits using hardware definition languages, such as Verilog and VHDL. Synthesis and implementation applications can be used to convert a logical representation of an integrated circuit into a physical representation of the circuit. Such a physical representation can then be used to create a physical chip, or to program a field programmable gate array. Several synthesis and implementation applications allow a chip designer to specify design constraints (such as chip size and clock frequency) that must be satisfied by a physical implementation of the circuit. If the synthesis and implementation application cannot create a physical representation of the circuit that satisfies these constraints, the application usually will not generate a physical representation, and instead may return one or more error messages explaining the failure.

DETAILED DESCRIPTION

Circuit synthesis and implementation can be a time-consuming and labor intensive process. Many of the synthesis and implementation applications that are currently available perform operations that are computationally intensive. Depending on the complexity of a circuit design, it can take several minutes or hours for a synthesis and implementation application to complete an implementation run. Furthermore, the process is typically iterative. If an implementation run fails to produce a physical implementation that satisfies a given set of design constraints, the circuit designer often must manually edit the circuit design and/or adjust the design constraints and use the synthesis and implementation application to perform another implementation run. In some cases, it can take several adjustments and subsequent implementation runs to identify and resolve faults in the circuit design, or to conclude that the desired set of design constraints is not viable for the given circuit design.

At least some of the embodiments of the technologies described herein address these problems by reducing the time required to identify design faults in a circuit design and/or identify viable alternative design constraints.

For example, input design constraints can be automatically adjusted to create multiple modified constraints. Multiple implementation runs can be automatically performed for a circuit design using the multiple modified constraints. In at least some embodiments, the multiple implementation runs can be performed using multiple implementation processes that, in whole or in part, can be executed in parallel. Two or more processes or threads can be considered to be executed in parallel when their executions overlap in time, at least in part (e.g., so that they are running, at least in part, at a same time).

Results of the multiple implementation runs can be compiled and analyzed to identify potential design faults that may not have been apparent from a single implementation run using the input design constraints. Additionally or alternatively, one or more circuit implementation recommendations can be generated based on the analysis of the implementation run results. In a different or further embodiment, the circuit design can be automatically adjusted to create one or more modified versions of the circuit design. Multiple implementation runs can be performed using the one or more modified versions of the circuit design in combination with the input design constraints and/or modified versions of the design constraints.

Figure 1:
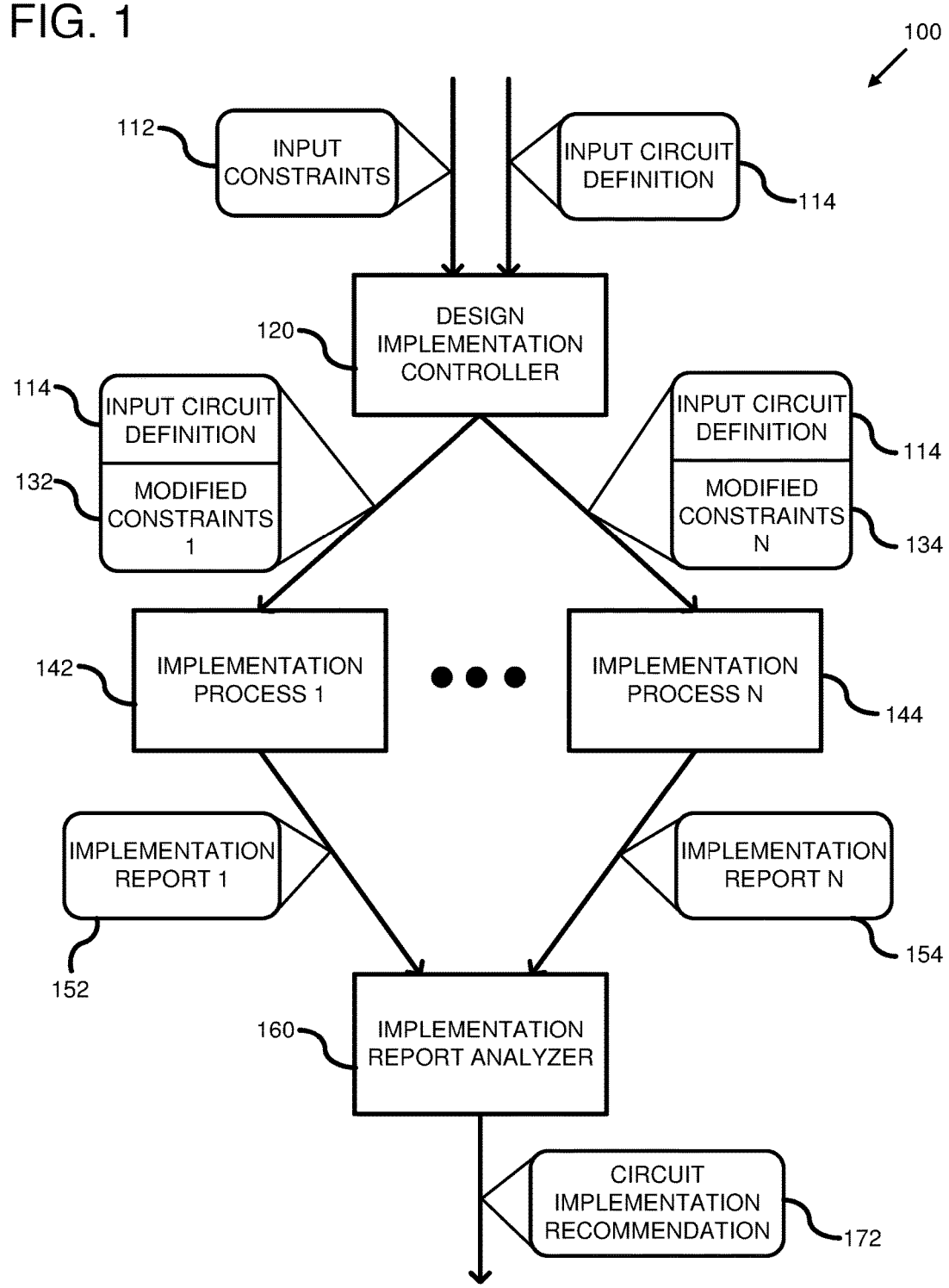
FIG. 1 is a system diagram showing an example system for determining a circuit implementation recommendation.

FIG. 1 is a system diagram showing an example system 100 for determining a circuit implementation recommendation 172, given one or more input constraints 112 and an input circuit definition 114. The example system 100 comprises a design implementation controller 120, one or more implementation processes 142-144, and an implementation report analyzer 160.

The design implementation controller 120 is configured to receive the one or more input constraints 112 and the input circuit definition 114. The design implementation controller 120 can generate multiple modified versions of the one or more input constraints 112 and transmit the input circuit definition 114 and the multiple modified versions of the one or more input constraints 112 to the one or more implementation processes 142-144. As described herein, the modified constraints 132-134 can be generated by relaxing and/or restricting the input constraints 112. In at least some embodiments, the design implementation controller 120 also transmits the input constraints 112 to one of the one or more implementation processes 142-144 with the input circuit definition 114. The design implementation controller 120 can comprise one or more hardware and/or software components of a computing device.

In at least some embodiments, the design implementation controller 120 can transmit modified constraints (e.g., 132-134) to multiple separate implementation processes 142-144. In at least some cases, the multiple implementation processes 142-144 can be executed, at least in part, in parallel. For example, this can occur in embodiments comprising computing devices with multiple central processing units (CPUs), a computing device comprising a CPU with multiple processing cores, multiple virtual machines, and/or multiple computing devices. Although the implementation processes 142-144 are referred to herein as "processes," it is possible for them to take the form of other execution constructs besides independent processes that are managed by an operating system. For example, in at least some embodiments, the implementation processes 142-144 can be threads in a multi-threaded synthesis and implementation application.

Although multiple implementation processes 142-144 are depicted in FIG. 1, embodiments comprising the single implementation process are also possible. In such an embodiment, the input circuit definition 144, and the modified constraints 132-134, can be transmitted to the single implementation process in sequence. For example, the design implementation controller 120 can transmit the input circuit definition 114 and the modified constraints 132 to the single implementation process. After the single implementation process has completed execution using the input circuit definition 114 and the modified constraints 132, the design implementation controller 120 can transmit the input circuit definition 114 and another of the modified constraints (e.g., 134) to the single implementation process. This process can continue until processing on all of the multiple modified constraints 132-134 has completed.

An implementation process (e.g., 142, 144) is configured to receive the input circuit definition 114 and one or more modified constraints (e.g. 132, 134) from the design implementation controller 120 and to perform a circuit implementation run using the input circuit definition 114 and the one or more modified constraints. Performing the circuit implementation run can comprise attempting to convert a logical description of a circuit contained in the input circuit definition 114 into a gate level description of the circuit that will satisfy the one or more modified constraints. In at least some embodiments, the logical description of the circuit can include a register-transfer-level (RTL) abstraction of the circuit written in a hardware description language (HDL), such as the Verilog or VHDL.

In at least some cases, an implementation process can be configured to convert the logical description of the circuit into a bitstream that can be provided to a programmable logic device. A programmable logic device can comprise one or more electronic components that can be used to create reconfigurable digital circuits. Example programmable logic devices include, but are not limited to, field programmable gate arrays (FPGAs). In at least some embodiments, the bitstream that is generated by the implementation process can be uploaded to an FPGA to configure one or more programmable logic blocks and/or interconnects in the FPGA to create a digital circuit.

Performing the implementation run can comprise clock-tree synthesis and/or simulating the operation of the circuit after a candidate physical layout of the circuit has been created. Such simulation can be used to determine whether operation of the circuit in the candidate physical layout satisfies one or more timing-related constraints in the provided modified constraints.

In at least some embodiments, the example system 100 can support different types of implementation processes that can be used when different physical embodiments of the circuit are desired. For example, a particular type of implementation process can be used when the desired physical embodiment is an FPGA, and another particular type of implementation process can be used when the desired physical embodiment is another type of integrated circuit, such as an application-specific integrated circuit (ASIC), a system-on-a-chip (SOC), or a memory. Additionally or alternatively, different implementation processes can be configured to spend different levels of effort (e.g., different amounts of computation time) in attempting to generate a physical representation that satisfies a given set of constraints.

An implementation process (e.g., 142, 144) can be configured to generate an implementation report (e.g., 152, 154) based on the results of the implementation run. The implementation report can indicate whether the attempt to convert the logical description of the circuit to a physical representation within the one or more modified constraints was successful. The implementation report can include details about any errors and/or warnings that were encountered during the implementation run.

The implementation report analyzer 160 is configured to receive the implementation reports 152-154, corresponding to the separate circuit implementation runs, and to generate a circuit implementation recommendation 172 based on the received implementation reports 152-154. In at least one embodiment, the one or more implementation processes 142-144 are logically coupled to the implementation report analyzer 160 and transmit the implementation reports 152-154 to the implementation report analyzer 160. For example, the one or more implementation processes 142-144 and the implementation report analyzer 160 can be components of a synthesis and implementation application. Alternatively, the one or more implementation processes 142-144 and implementation report analyzer 160 can be components of separate applications. For example, implementation processes 142-144 can be configured to write the implementation reports 152-154 to a storage location (such as a file system, database, etc.) that is accessible to both the implementation processes 142-144 and the implementation report analyzer 160. The implementation report analyzer 160 can retrieve the implementation reports 152-154 from the storage after they are written.

The implementation report analyzer 160 can examine the implementation reports 152-154 to identify one or more of the modified constraints 132-134 that could be satisfied by implementation runs and/or one or more of the modified constraints that could be satisfied by the implementation runs. For example, the implementation report analyzer 160 can examine an implementation report to determine whether the corresponding implementation run was successful, or resulted in one or more errors. The implementation report analyzer 160 can determine which of the modified constraints 132-134 was provided as input to the corresponding implementation run and can correlate the error and/or success indicator with those particular modified constraints. After repeating this process for the other received implementation reports, the implementation report analyzer 160 can analyze the error and success indicators correlated with the various modified constraints 132-134 to identify permutations of the constraints that can and/or cannot be satisfied when implementing the input circuit definition 114. In at least some embodiments, the analysis performed by the implementation report analyzer 160 comprises identifying an optimal set of constraints that can be satisfied by a physical implementation of the input circuit definition 114. In an example embodiment where the input constraints 112 include an input chip size and an input chip clock frequency, an optimal set of constraints can include a highest chip clock frequency and a smallest chip size that both can be satisfied by a physical implementation of the input circuit definition 114. Additionally or alternatively, the circuit implementation recommendation 172 can include a range of constraint combinations that can be satisfied by physical implementations of the input circuit definition 114. Such a range of constraint combinations can be generated by identifying the various modified constraints 132-134 that are associated with successful implementation runs. In embodiments where the input constraints 112 are provided to one of the implementation processes 142-144, the circuit implementation recommendation 172 can indicate whether the input constraints 112 can be satisfied by a physical implementation of the input circuit definition 114. In at least some such embodiments, a relationship between an identified optimal set of constraints and the input constraints 112 can be provided in the circuit implementation recommendation 172.

In at least one embodiment, the circuit implementation recommendation 172 can indicate whether a physical representation of the input circuit definition 114 could be created using the input constraints. The circuit implementation recommendation 172 can indicate one or more alternative sets of modified constraints, for which a physical representation could be created.

For example, the input constraints 112 can comprise a target FPGA chip size and target clock frequency. The implementation report analyzer 160 may determine, based on the analysis of the implementation reports 152-154 that a physical representation of the circuit definition 114 could not be created using the target FGPA chip size and target clock frequency, but that a physical representation could be generated that would meet the target clock frequency by using an FPGA chip size one size larger than the target chip size. Additionally or alternatively, the implementation report analyzer 160 may determine that a physical representation could be created within the target FPGA chip size, but only if the clock frequency is cut in half. In another example, the implementation report analyzer 160 may determine that a physical representation can be generated that meets the target chip size and clock frequency, but that a physical representation could also be generated using an FPGA chip size one size smaller than the target chip size and/or with a clock frequency that is twice as fast as the target clock frequency.

In any of the examples described herein, a circuit design or circuit definition can comprise a logical design for a digital integrated circuit, such as a microprocessor, an FPGA, an ASIC, an SOC, a memory, or some combination thereof. A circuit design can comprise one or more logical representations of the circuit's functionality, which can include RTL abstractions. In at least some embodiments, at least part of the circuit design can comprise statements written in an HDL, such as Verilog, VHDL, or the like.

In any of the examples described herein, an input constraint can be a condition or limit which a circuit designer wishes to be satisfied by a physical implementation of a circuit design. The constraints can also be referred to as "design implementation constraints." Example input constraints include target chip sizes and/or target chip timings (or frequencies). In some cases, a combination of constraints provided to an implementation process can be referred to as an "implementation strategy." Using technologies described herein, input constraints can be modified automatically to create multiple implementation strategies that, when provided to implementation processes, can be used to identify boundary conditions for a given circuit design.

In at least some cases, modifying one input constraint can identify problems in a given circuit design related to a different input constraint. For example, performing multiple implementation runs where an input chip size constraint is relaxed by increasing amounts (e.g., performing a first implementation run with the input chip size, performing a second implementation run with double the input chip size, performing a third implementation run with triple the input chip size, etc.) can effectively eliminate the chip size as a factor in the analysis of a recurring implementation error and may help to detect frequency-related problems with the design.

Figure 2:
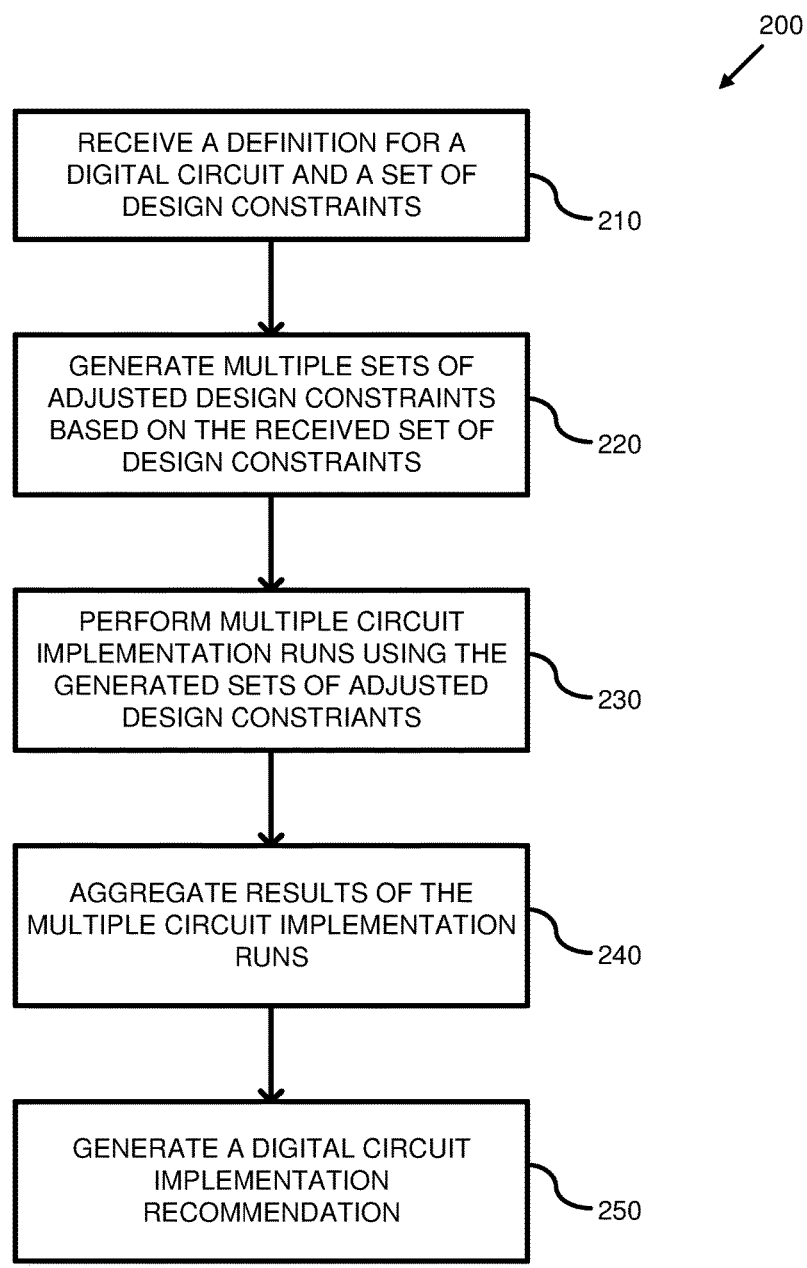
FIG. 2 is a flowchart of an example method for identifying a design fault in a digital circuit definition by using multiple sets of adjusted design constraints.

FIG. 2 is a flowchart of an example method 200 for generating a digital circuit implementation recommendation using multiple sets of adjusted design constraints. The example method 200 can be performed using any of the example systems described herein.

At 210, a definition for a digital circuit is received, along with a set of design constraints. The definition for the digital circuit can comprise a logical description of the digital circuit's functionality (such as an RTL description written in an HDL). The set of design constraints can include one or more target specifications for a physical implementation of the digital circuit. For example, the set of design constraints can comprise a desired chip size and/or clock frequency for an FPGA, ASIC, SOC, etc. that implements the digital circuit.

At 220, multiple sets of adjusted design constraints are generated based on the received set of design constraints. Generating the multiple sets up adjusted design constraints can comprise relaxing one or more of the received design constraints, restricting one or more of the received design constraints, or a combination thereof. For example, in an embodiment where the received set of design constraints comprises an input chip size, one or more of the multiple sets of adjusted design constraints can comprise chip sizes that are larger than the input chip size. Additionally or alternatively, one or more of the multiple sets of adjusted design constraints can comprise chip sizes that are smaller than the input chip size. In a particular embodiment, a predetermined range of chip sizes (e.g., a range of FPGA sizes) can be provided, one of which is specified in the set of design constraints. In such an embodiment, one or more of the multiple sets of adjusted design constraints can include chip sizes in the predetermined range of chip sizes that are different from the chip size specified in the received set of design constraints.

In a different or further embodiment, the received set of design constraints comprises an input frequency. In such an embodiment, one or more of the multiple sets of adjusted design constraints can include frequencies that are faster than the input frequency. Additionally or alternatively, one or more of the multiple sets of adjusted design constraints can include frequencies that are slower than the input frequency. For example, a clock frequency can be provided as one of the received set of design constraints and one of the multiple sets of adjusted design constraints can include a clock frequency that is twice as fast as the provided clock frequency. Additionally or alternatively, one of the multiple sets of adjusted design constraints can include a clock frequency that is half the speed of the provided clock frequency. In different or further embodiments, a range of alternative clock frequencies can be specified. For example, one of the multiple sets of adjusted design constraints can include a clock frequency of 1 MHz, another of the multiple sets up adjusted design constraints can include a clock frequency of 10 MHz, etc. The particular clock frequencies that are specified can vary based on the circumstances and/or the type of digital circuit.

In an embodiment where the received set of design constraints comprises a target chip size and a target frequency, the multiple sets of adjusted design constraints can include various permutations of both chip size and frequency in combination. For example, one or more of the sets of adjusted design constraints can include modified versions of the chip size in combination with the target frequency.

Additionally or alternatively, one or more of the sets of adjusted design constraints can include modified versions of the frequency in combination with the target chip size. Additionally or alternatively, one or more of the sets of adjusted design constraints can be generated by changing both the target chip size and the target frequency.

At 230, multiple circuit implementation runs are performed using the generated sets of adjusted design constraints. In at least some embodiments, a circuit implementation run is also performed using the received set of design constraints. The multiple circuit implementation runs are performed to determine which of the various sets of design constraints (adjusted and/or received) can be satisfied by a physical implementation of the digital circuit definition. An implementation process, such as a synthesis and implementation application, can be used to perform the circuit implementation runs. The definition for the digital circuit and one of the sets of adjusted design constraints can be provided to the implementation process. The implementation process can then perform the implementation run by attempting to generate a gate-level representation of the digital circuit and/or a physical layout of the digital circuit that will satisfy the given set of adjusted design constraints. In at least some cases, the implementation process can perform one or more simulations of the operation of the digital circuit to determine whether any frequency-based constraints are satisfied. The implementation process can generate a result after the implementation run is complete that indicates whether a physical implementation of the digital circuit could be created that would satisfy the given set of adjusted design constraints. In at least some embodiments, when a physical implementation of the digital circuit cannot satisfy the given set of adjusted design constraints, the result can include a description of one or more errors that were encountered during the implementation run. When a physical implementation of the digital circuit was successfully created that satisfied the given set of adjusted design constraints, the result can include a physical implementation artifact, such as a netlist and/or bitstream, embodying the physical implementation.

In some embodiments, multiple implementation processes can be used to perform the multiple circuit implementation runs. Multiple implementation processes can be executed in parallel to perform multiple implementation runs, using different sets of adjusted design constraints, simultaneously. In at least some cases, using multiple implementation processes can reduce the overall time needed to perform all of the multiple circuit implementation runs. However, in at least some of these cases, the reduction in overall execution time requires additional computing resources to be allocated for performing the example method 200. Furthermore, in scenarios where the implementation process is an instance of a third-party application (such as a third-party synthesis and implementation tool), executing multiple implementation processes may require the purchase of additional licenses.

At 240, the results of the multiple circuit implementation runs are aggregated. The aggregation can comprise parsing the results to determine which of the results indicates a success and/or which of the results indicates a failure. In the case of a failure, information about one or more particular errors that were encountered during implementation run can also be extracted. The parsed results can then be correlated with the various sets of design constraints that were provided to the multiple circuit implementation runs. For example, a given implementation result can be parsed to determine that a physical implementation of the digital circuit could be created that would satisfy the design constraints provided to that particular implementation run. The set of design constraints that was provided to that particular implementation run can be identified and associated with the success indicator. In another example, a given implementation result can be parsed to determine that a physical implementation of the digital circuit which would satisfy the provided set of design constraints could not be created. Information about one or more particular errors can be extracted from the result. The set of design constraints that was provided to that implementation run can be identified and associated with a failure indicator. If information about one or more particular errors was extracted from the result, all or part of that information can be associated with the set of design constraints.

At 250, a digital circuit implementation recommendation is generated. The digital circuit implementation recommendation can comprise all or part of the aggregated results created at 240. The aggregated results can be analyzed to identify one or more design constraints boundary conditions for the implementation of the digital circuit. For example, by examining the success and/or failure information associated with each of the sets of adjusted design constraints, it can be determined that an error occurred in one of the multiple circuit implementation runs for one set of adjusted design constraints, but the error did not occur in another of the multiple circuit implementation runs for another set of adjusted design constraints. Given a range of design constraint values that were included in various sets of adjusted design constraints, an edge (or boundary) condition for the design constraints can be identified. In some cases, this can be a largest (or smallest) value for the design constraint where a circuit implementation run for the digital circuit was successful. For example, a fastest clock frequency that can be supported by a physical implementation of the digital circuit can be identified. Additionally or alternatively, a smallest chip size that can be supported by physical implementation of the digital circuit can be identified. In some cases, an "optimal" set of design constraints can be identified that comprises a best combination of design constraints for which a physical implementation of the digital circuit can be supported. In such cases, the digital circuit implementation recommendation can include a physical implementation representation (such as a netlist) corresponding to the "optimal" set of design constraints.

A physical implementation representation can be obtained from one of the multiple circuit implementation runs to which the "optimal" set of design constrains was provided at 230. For example, the results generated by the multiple implementation runs at 230 can comprise one or more physical implementation representations. The one or more physical implementation representations can be associated with corresponding sets of adjusted design constraints at 240. One of the multiple sets of design constraints can be identified as an "optimal" set of design constraints, as discussed above, and a physical implementation representation associated with the identified set of design constraints can be included in the digital circuit implementation recommendation at 250.

Additionally or alternatively, the digital circuit implementation report can identify one or more potential design faults in the definition for the digital circuit. For example, the report can identify that a same or similar error occurred in multiple circuit implementation runs with the various chip size constraints, indicating a problem related to a design constraint other than chip size (such as frequency).

Figure 3:
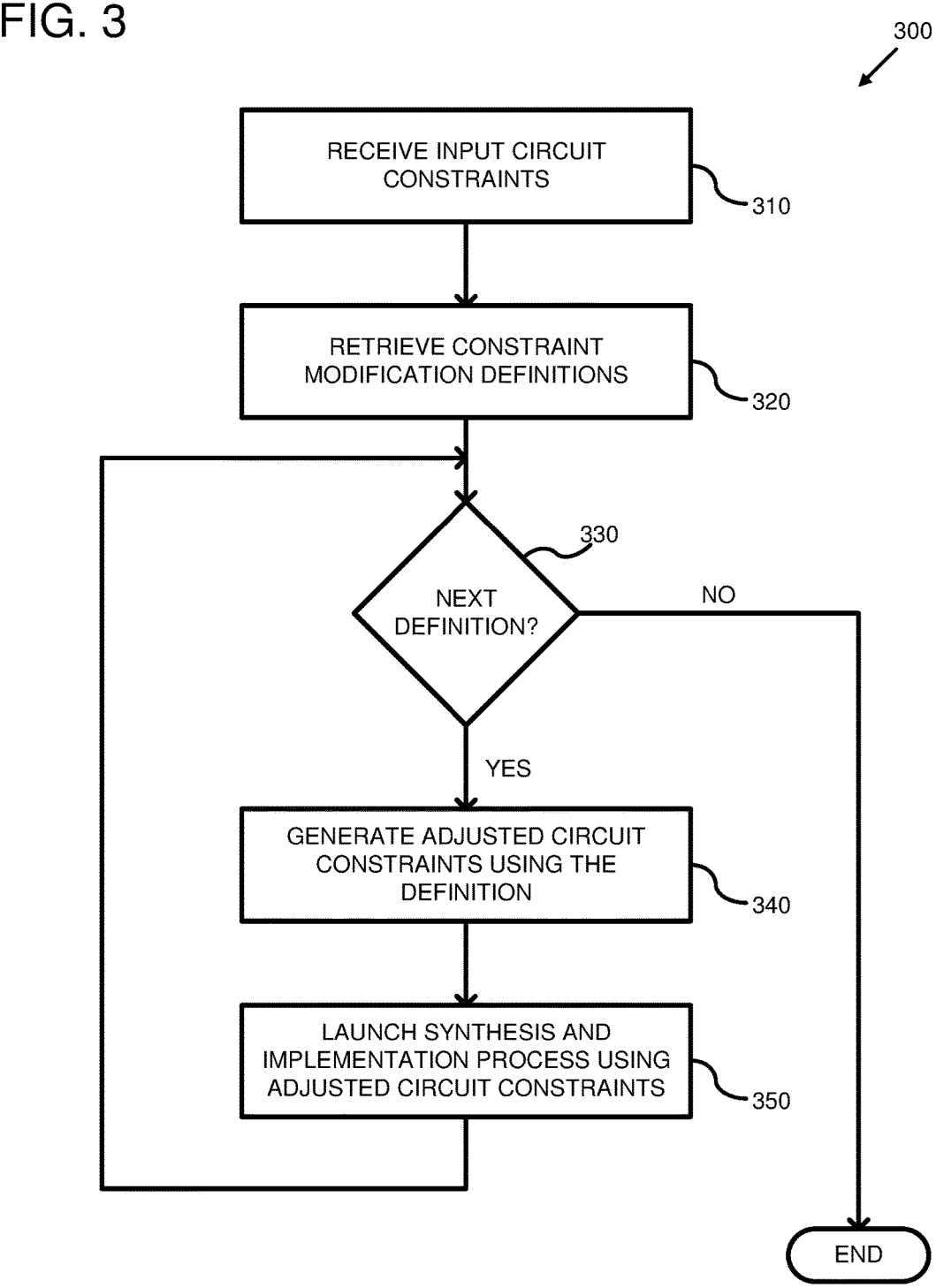
FIG. 3 is a flowchart of an example method for generating modified circuit constraints.

FIG. 3 is a flowchart of an example method 300 for generating modified circuit constraints. The example method 300 can be performed using any of the example systems described herein. For example, the example method 300 can be performed by a design implementation controller, a flexible constraint implementation controller, or the like, to generate modified versions of input design constraints.

At 310, one or more input circuit constraints are received. The one or more input circuit constraints can comprise requirements that a circuit designer wishes a physical implementation of a circuit to satisfy. Example input circuit constraints include a physical chip size or area and/or a synchronization clock frequency. However, other input constraints are also possible.

At 320, constraint modification definitions are retrieved. The constraint modification definitions can be stored in a storage of a computing device, a memory of a computing device, or some combination thereof. The constraint modification definitions can be stored as one or more files, database records, or the like. The constraint modification definitions can specify various ways in which the input circuit constraints should be adjusted. Different constraint modification definitions can be specified for different types of input circuit constraints. For example, one or more constraint modification definitions can apply to clock frequency input circuit constraints, while one or more other constraint modification definitions can apply to chip size or area input circuit constraints. It is possible for one or more constraint modification definitions to apply to more than one type of input circuit constraint. For example, a constraint modification definition that increases an input circuit constraint value by a specified factor could apply to any input design constraint with a numerical value.

At 330, an attempt is made to select a next constraint modification definition from the retrieved constraint modification definitions. If a next constraint modification definition was successfully selected, then at 340, one or more adjusted circuit design constraints are adjusted using the selected constraint modification definition. A constraint modification definition can comprise one or more rules and/or executable instructions that can be used to modify one or more of the input circuit constraints to create one or more adjusted circuit constraints. Although the adjusted circuit constraints are referred to as "adjusted," one or more of the adjusted circuit constraints may retain a value or values of one or more of the input circuit constraints. For example, the input constraints may include an input frequency and an input chip size, but a given constraint modification definition may contain rules and/or instructions for modifying only the input chip size. In such a case, the resulting adjusted circuit constraints would include the modified chip size and the input frequency. Additionally or alternatively, a given constraint modification definition can modify multiple input circuit constraints in different ways. For example, the given constraint modification definition may include rules and/or instructions for reducing an input frequency constraint value by a given amount, and doubling a value of an input chip area constraint. In a different or further embodiment, a constraint modification definition can include rules and/or instructions for replacing an input circuit constraint value with a different specified value. For example, a given constraint modification definition may include rules and/or instructions for providing an adjusted frequency constraint with a value of 1 MHz, regardless of the value of an input frequency circuit constraint. Multiple constraint modification definitions can be provided to embody various combinations of adjusted circuit constraints.

At 350, a synthesis and implementation process is launched using the adjusted circuit constraints generated at 340. Launching the synthesis and implementation process can be a synchronous or asynchronous operation. In an embodiment where launching the synthesis and implementation process is a synchronous operation, execution of the example method 300 can be blocked until the synthesis and implementation process completes a circuit implementation run using the adjusted circuit constraints. Once the synthesis and implementation process has completed, control returns to 330. In an embodiment where launching the services and implementation process is an asynchronous operation, control returns to 330 after the synthesis and implementation process has been launched. In a computing environment capable of parallel processing, the launched synthesis and implementation process can be executed, at least in part, while the example method 300 continues to be performed. In at least one embodiment, the synthesis and implementation process is represented by child thread of a multithreaded application that also implements the example method 300. In such an embodiment, the example method 300 can be executed on a parent thread, while one or more synthesis and implementation processes are executed on one or more child threads.

At 330, if the attempt to select a next constraint is unsuccessful (i.e., all of the retrieved constraint modification definitions have been processed), then the example method 300 terminates.

Figure 4:
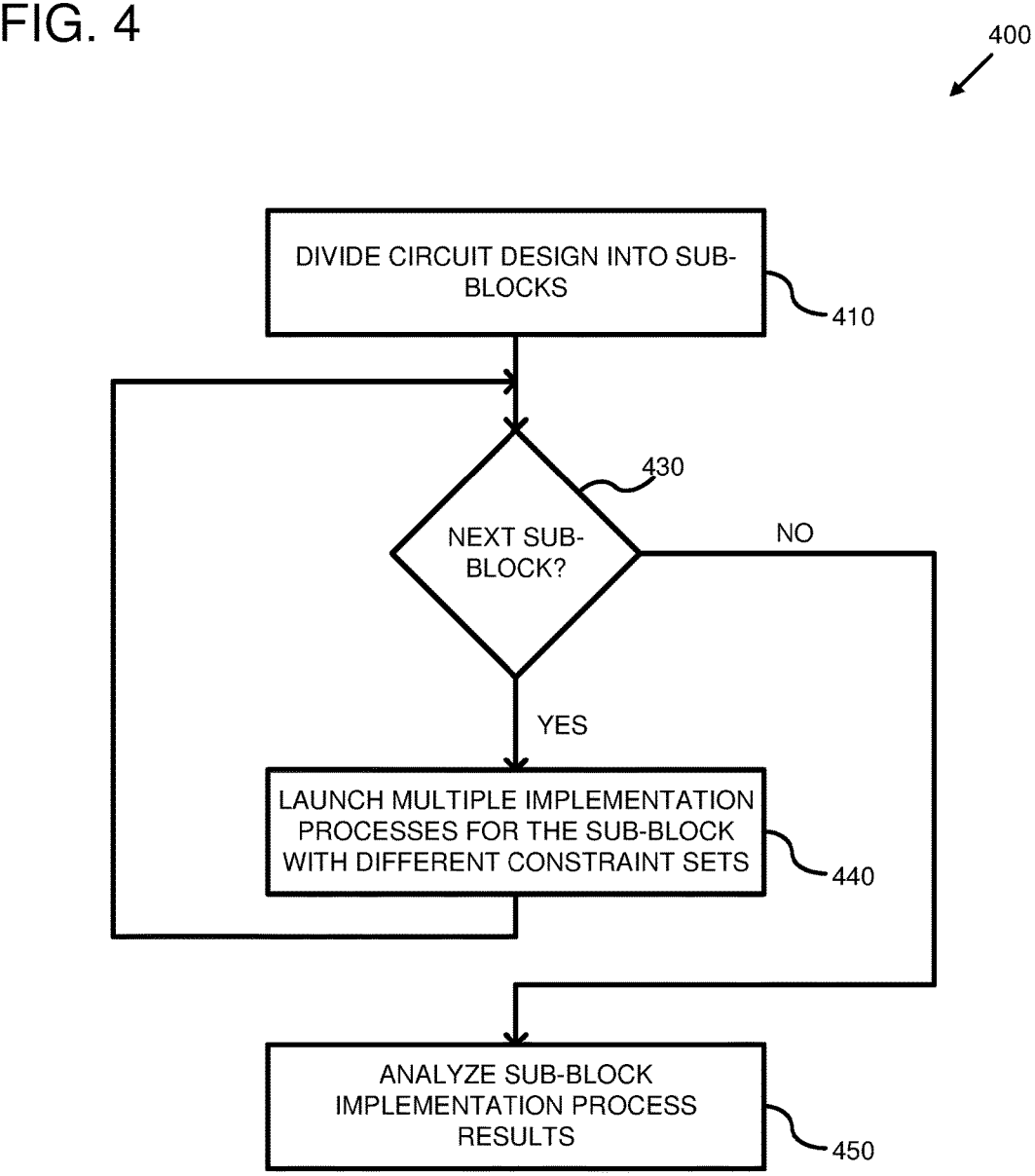
FIG. 4 is a flowchart of an example method for performing multiple implementation runs using sub-blocks of a circuit design.

FIG. 4 is a flowchart of an example method 400 for performing multiple implementation runs using sub-blocks of a circuit design. The example method 400 can be performed using any of the example systems described herein. For example, the example method 400 can be performed by a design implementation controller, a flexible constraint implementation controller, or the like.

At 410, a circuit design is divided into circuit design sub-blocks. In at least one embodiment, dividing the digital circuit design into circuit design sub-blocks comprises identifying multiple executable blocks within the digital circuit design. For example, executable blocks can include functional blocks, such as video encoder engines, compression engines, image recognition engines, etc. Additionally or alternatively, executable blocks can include functional design modules, such as adders, multipliers, etc. In at least some cases, asynchronous bridges can be automatically added to the circuit design to connect the sub-blocks.

In a different or further embodiment, dividing the digital circuit design into circuit design sub-blocks comprises separating the circuit design along one or more geographic boundaries, such as clock boundaries. For example, separate clock inputs can be provided for the sub-blocks and, in at least some cases, the sub-blocks can operate at different clock frequencies.

The separate sub-blocks can be represented by separate circuit design documents, such as separate RTL representations of circuit logic associated with the various portions of the circuit design. Alternatively the separate sub-blocks can be defined in a single, modified circuit design.

At 430, an attempt is made to retrieve a next circuit design sub-block from the circuit design sub-blocks created at 410. If a next circuit design sub-block was successfully retrieved at 430, then at 440 multiple implementation processes are launched for the sub-block with different design constraint sets. A given input design constraint set can be modified using techniques described herein to create the different design constraint sets that are provided to the multiple implementation processes in combination with the circuit design sub-block. Implementation run results generated by the multiple implementation processes can be retrieved and stored for later analysis. In various embodiments, the multiple implementation processes can be launched sequentially or in parallel. In at least one embodiment, a single synthesis and implementation application is used to perform the implementation runs for the circuit design sub-block using the different design constraint sets. In an alternative embodiment, multiple instances of the synthesis and implementation application are launched and used to perform separate implementation runs using different design constraint sets.

After the multiple implementation processes are launched (and/or have completed), control returns to 430. If the attempt to select a next sub-block at 430 is not successful, then at 450, the sub-block implementation process results are analyzed. The analysis can comprise, for each circuit design sub-block, identifying one or more of the different constraint sets that can be supported by a physical implementation of the circuit design sub-block. Additionally or alternatively, the set of design constraints can be identified that can be supported by a physical implementation of a combination of the circuit design sub-blocks.

In at least some embodiments, one or more performance and/or implementation improvements can be identified that would be achieved by implementing the circuit in the multiple sub-blocks. For example, one or more implementation processes can also be launched using different constraint sets to perform implementation runs on the circuit design as a whole. Results of these "whole circuit" implementation runs can be compared with the circuit design sub-block implementation run results to determine whether better constraints (such as chip size and/or frequency) can be achieved by implementing the circuit with or without the sub-blocks.

Figure 5:
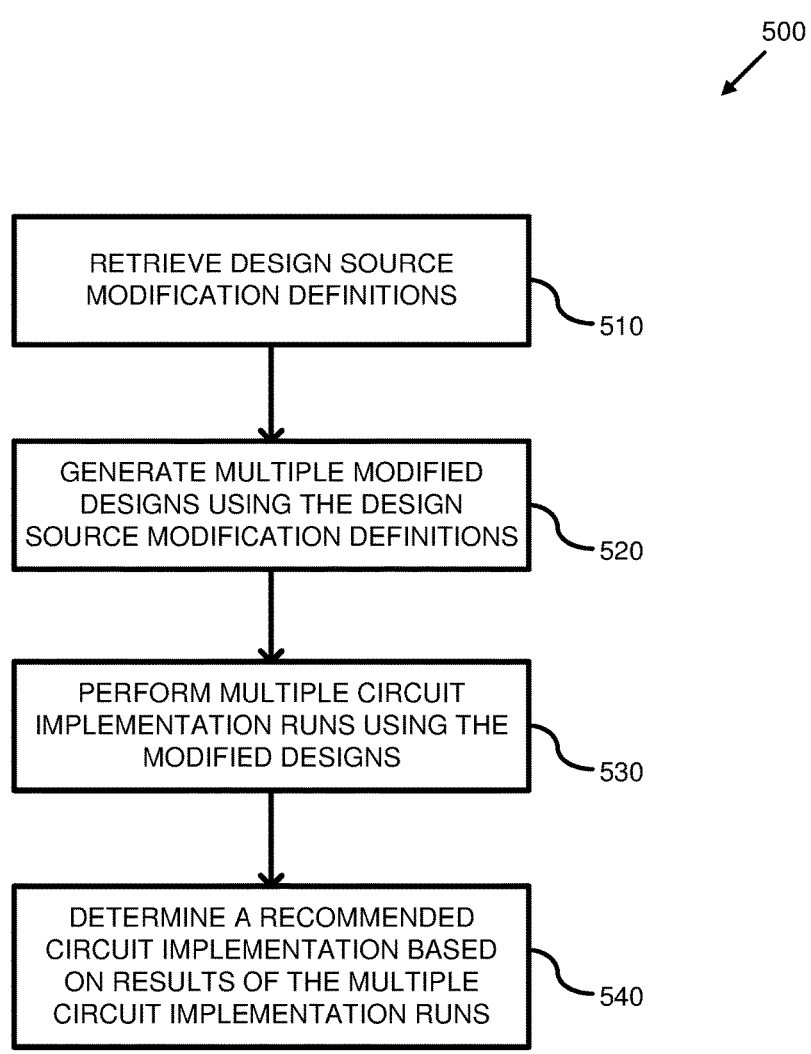
FIG. 5 is a flowchart of an example method for performing multiple implementation runs with multiple modified circuit designs.

FIG. 5 is a flowchart of an example method 500 for performing multiple implementation runs with multiple modified circuit designs. The example method 500 can be performed using any of the example systems described herein. For example, the example method 500 can be performed by a design implementation controller, a flexible constraint implementation controller, or the like. In any of the embodiments described herein, generating multiple sets of adjusted design constraints can comprise creating multiple versions of the circuit design.

At 510, design source modification definitions are retrieved. The design source modification definitions can be stored in a storage of a computing device, a memory of a computing device, or some combination thereof. The design source modification definitions can be stored as one or more files, database records, or the like. The design source modification definitions can specify various ways in which a logical circuit design can be adjusted.

At 520, multiple modified circuit designs are generated using the circuit design source modification definitions. A circuit design source modification definition can comprise one or more rules and/or executable instructions for modifying the source code of the digital circuit design. For example, the digital circuit design can include source code written in an HDL that represents an RTL abstraction of the digital circuit. When a circuit design source modification definition is processed, one or more portions of the digital circuit design source code can be edited, deleted, and/or added to create a modified version of the digital circuit design.

The circuit design source modification definitions can be configured to alter the circuit design source in various different ways. For example a circuit design source modification definition can be defined that will change a data path width specified in the digital circuit design. In a different or further embodiment, a circuit design source modification definition can be defined that will change a size of a memory specified in the digital circuit design. In a particular example, a digital circuit design can be provided that specifies a memory size of 128 MB. One or more circuit design source modification definitions can be provided that will generate multiple modified versions of the circuit design with memory sizes of 256 MB, 512 MB, etc.

At 530, multiple circuit implementation runs are performed using the modified designs. Techniques described herein for performing circuit implementation runs can be used to perform the multiple circuit implementation runs. The multiple circuit implementation runs can be performed sequentially or in parallel. In at least some embodiments, the modified circuit designs can be provided to one or more implementation processes in combination with a set of input design constraints. In a different or further embodiment, the modified circuit designs can be provided to one or more implementation processes in combination with multiple modified versions of the input design constraints. The multiple modified versions of the input design constraints can be generated using various techniques described herein. Results of the multiple circuit implementation runs can be retrieved and aggregated to associate the various combinations of modified circuit designs and design constraints with success and/or failure indicators and error information.

At 540, a recommended circuit implementation is determined based on the results of the multiple circuit implementation runs. Determining the recommended circuit implementation can comprise identifying one of the combinations of modified circuit designs and design constraints that represents a "best" set of parameters for which a physical implementation of the digital circuit can successfully be created. For example, modifying one or more portions of the circuit design source can make it possible to physically implement the digital circuit within specified design constraints, whereas it may not have been possible to implement the original circuit design within the specified design constraints. Additionally or alternatively, modifying one or more portions of the circuit design source may enable a physical implementation of the digital circuit in better design constraints (e.g., a faster block frequency, a smaller chip size, etc.) than was possible using the unmodified circuit design.

Additionally or alternatively, the recommended circuit implementation can identify a range of modified circuit design and input constraint combinations that resulted in successful implementation runs. In at least some cases, modifying the circuit design source can improve some aspects of the circuit design at the expense of others. For example, increasing the memory size and/or data path width of the circuit design may allow the circuit design to support faster timing frequencies. However, the larger memory and/or data paths may cause the circuit design to require a larger chip size. Such alternative implementation scenarios can be identified and presented as part of the recommended circuit implementation.

Figure 6:
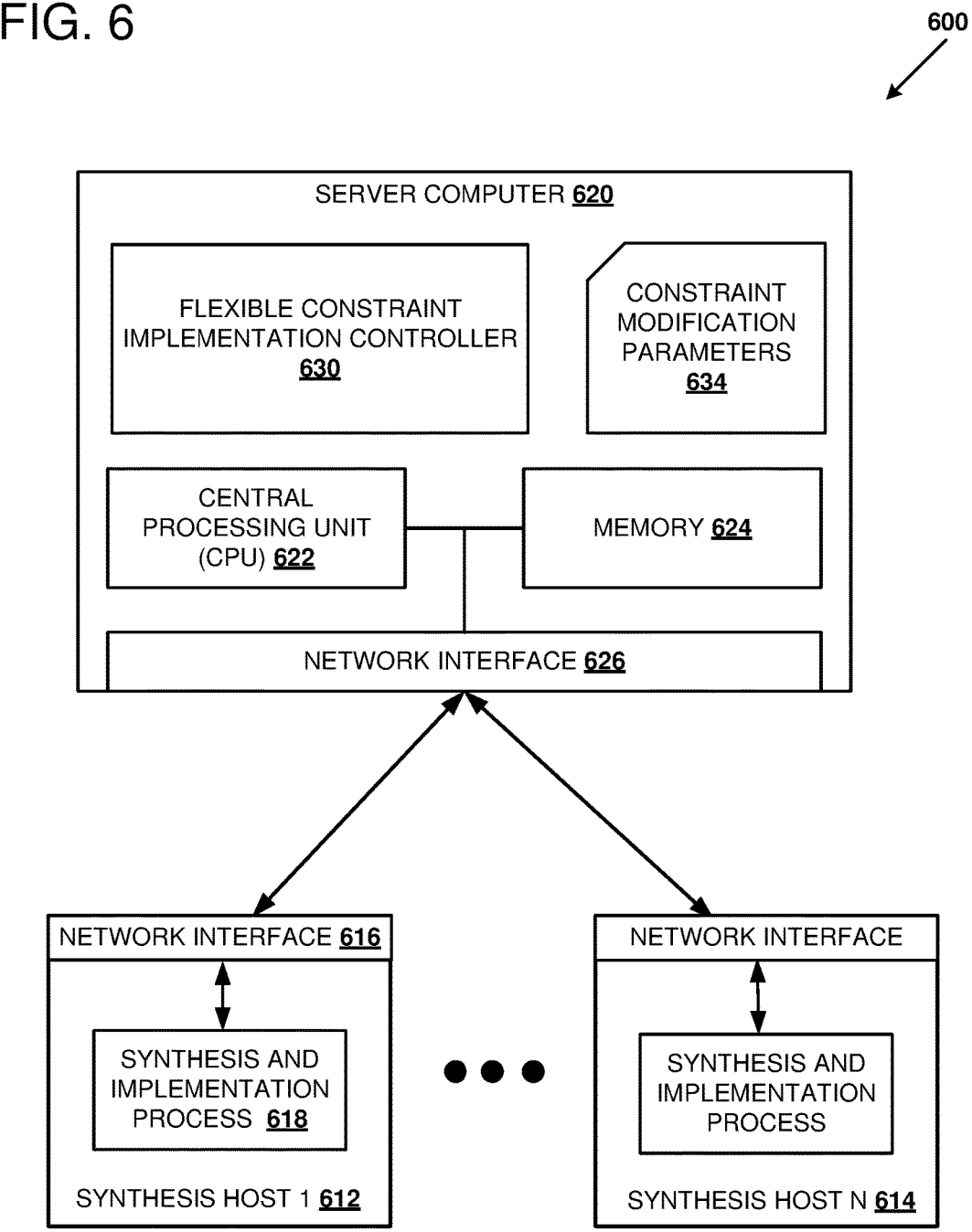
FIG. 6 is a system diagram showing an example system for performing multiple implementation runs using multiple synthesis and implementation processes.

FIG. 6 is a system diagram showing an example system 600 for performing multiple implementation runs using multiple synthesis host computing devices 612-614. The example system 600 comprises a server computer 620 and the multiple synthesis host computing devices 612-614. The server computer 620 comprises a CPU 622, a memory 624, and a network interface 626. The server computer 620 further comprises a flexible constraint implementation controller 630 and one or more constraint modification parameters 634. The flexible constraint implementation controller 630 can be implemented using one or more software components and/or one or more hardware components of the server computer 620. For example, the flexible constraint implementation controller 630 can comprise one or more software components stored in the memory 624 that are executed by the CPU 622. Additionally or alternatively, the flexible constraint implementation controller 630 can comprise one or more hardware components, such as FPGAs, ASICs, SOCs, etc. The one or more constraint modification parameters 634 can be stored in the memory 624, a storage of the server computer 620 (not shown), or some combination thereof. The network interface 626 can be connected to network interfaces (e.g. 616) of the synthesis host computing devices 612-614 via a computer network.

The flexible constraint implementation controller 630 can be configured to receive a digital circuit design and one or more design constraints associated with the design. The digital circuit design can comprise a logical representation of a digital circuit's behavior. For example, the digital circuit definition can comprise one or more statements written in an HDL that described in RTL abstraction of the digital circuit. The one or more design constraints can represent target requirements for a physical implementation of the digital circuit in accordance with the digital circuit design. For example, the one or more design constraints can identify a target maximum chip size, a target minimum clock frequency, etc.

The flexible constraint implementation controller 630 can be configured to retrieve constraint modification parameters 634 from the memory 624 and/or storage (not shown) of the server computer 620. In a different or further embodiment, one or more of the constraint modification parameters 634 can be retrieved from a memory and/or storage of a different computing device via a network connection. The constraint modification parameters 634 can be used by the flexible constraint implementation controller 630 to generate multiple modified versions of one or more of the received design constraints. For example, a constraint modification parameter can identify a range of alternative values for a design constraint. When the design constraint is received, the flexible constraint implementation controller 630 can generate multiple modified versions of the design constraint that contain one or more of the alternative values in the identified range of alternative values. Additionally or alternatively, a constraint modification parameter can specify an amount by which a value of the received design constraint can be adjusted. For example, the flexible constraint implementation controller 630 can adjust a value of the received design constraint by an amount (or amounts) specified in the constraint modification parameter to generate one or more modified versions of the design constraint. In at least some cases, multiple constraint modification parameters of the constraint modification parameters 634 can be used to create combinations of modified versions of multiple design constraints that are used together.

The flexible constraint implementation controller 630 can be configured to transmit the digital circuit design and the multiple modified versions of the design constraint to multiple synthesis and implementation processes (e.g., 618). The multiple synthesis and implementation processes can be executed on one or more synthesis host computing devices 612-614. The flexible constraint implementation controller 630 can transmit a copy of the digital circuit design, and one or more of the multiple modified versions of the design constraint, to one of the synthesis host computing devices via the network interface 626. For example, the flexible constraint implementation controller 630 can transmit a copy of the digital circuit design and one of the modified versions of the design constraint to the synthesis host 612. The synthesis host 612 can be configured to receive the digital circuit design and the modified version of the design constraint via the network interface 616. The digital circuit design and the modified version of the design constraint can then be passed to the synthesis and implementation process 618. The synthesis and implementation process 618 can then perform an implementation run to attempt to generate a physical representation of the digital circuit that will satisfy the modified version of the input constraint. The flexible constraint implementation controller 630 can transmit a copy of the digital circuit design, and a different modified version of the design constraint, to another synthesis host computing device (e.g., 614).

In some cases, the flexible constraint implementation controller 630 may be able to transmit each modified version of the design constraint to a separate synthesis host computing device. However, in some cases a number of modified versions of the design constraint may outnumber a number of available synthesis host computing devices. In such cases, the flexible constraint implementation controller 630 can transmit a first subset of the multiple modified versions of the design constraint to available synthesis host computing devices and, after synthesis and implementation processes on those synthesis host computing devices have completed execution, the flexible constraint implementation controller 630 can transmit a subsequent subset of the multiple modified versions of the design constraint to the synthesis host computing devices. Such a process can continue until implementation runs have been performed using all the multiple modified versions of the design constraint.

In at least some embodiments, transmission of the modified versions of the design constraint to the synthesis and implementation processes can be transmitted based on a priority of execution. For example, a subset of the modified versions of the constraint that are the most-restrictive can be transmitted first. An example of a most-restrictive clock frequency constraint is a fastest clock frequency constraint. Similarly, an example of a most-restrictive chip size constraint is a smallest chip size constraint. In at least some such embodiments, if at least one of the synthesis and implementation processes returns a response that indicates that a physical implementation of the design can be supported by one of the constraints in this first sub-set, the flexible constraint implementation controller 630 can abort the transmission of subsequent modified constraint subsets to the synthesis and implementation processes.

In at least some embodiments, other design constraints can be transmitted to the multiple synthesis and implementation processes with the multiple modified versions of the design constraint. For example, multiple design constraints may be received by the flexible constraint implementation controller 630, but constraint modification parameters 634 are specified to generate multiple modified versions of only one of the received design constraints. One of the modified versions of the design constraint can be transmitted, in combination with copies of the other received design constraints, to a synthesis and implementation process (e.g., 618). Additionally or alternatively, the constraint modification parameters 634 can be used to create multiple modified versions of more than one design constraint. Various combinations of the modified versions of different design constraints can be transmitted to separate synthesis and implementation processes. Implementation runs can then be performed using the various combinations of modified design constraints.

In at least some such embodiments, the combinations of modified design constraints can be organized in a tree data structure. For example, multiple versions of a first constraint can added as child nodes of a root of the tree. Multiple versions of a second constraint can then be added as leaf nodes to each of the nodes representing versions of the first constraint. Such a structure can be extended to more than two constraints by adding additional levels of sub-nodes. Unique combinations of the modified versions of each constraint can be obtained by traversing the tree data structure (i.e., a given leaf node in combination with all intervening parent nodes can represent a unique combination of constraints).

In a particular embodiment, the child nodes at each level of the tree (i.e., the various modified versions of a particular design constraint) are organized based on a priority of execution. For example, the nodes for the various versions of a given design constraint can be organized from lease restrictive to most restrictive. In at least some such cases, subsequent child nodes for a given node of the tree can be skipped once a physical representation is successfully created using a combination of modified constraints that includes a constraint associated with a child node of the given node.

The flexible constraint implementation controller 630 can be configured to receive implementation results from the multiple synthesis and implementation processes (e.g., 618). After a synthesis and implementation process has completed execution of an implementation run using a modified version of a design constraint, the result of the implementation run can be transmitted by the synthesis host computing device (e.g., 612) to the flexible constraint implementation controller 630. The flexible constraint implementation controller 630 can be configured to analyze the implementation results to determine a recommended implementation of the digital circuit design. Analyzing the implementation results can comprise correlating the implementation results with the multiple modified versions of the design constraint. The correlated results can be used to determine which of the multiple modified versions of the design constraint can be supported by physical implementations of the digital circuit. Of the multiple modified versions of the design constraint that can be supported by physical implementations of the digital circuit, a best or optimal version of the design constraint can be selected as the recommended implementation. One or more design constraint boundary conditions can be identified by detecting one or more errors that occurred in one implementation result but did not occur in another implementation result. For example, by performing multiple implementation runs with various versions of a design constraint, a boundary or edge value for the design constraint can be identified that may be different from the received design constraint value.

In embodiments where combinations of multiple modified design constraints are transmitted to each synthesis and implementation process, the implementation results can be correlated with the various combinations of the modified versions of the design constraints. In such cases, the recommended implementation can be a combination of design constraints that optimizes the values of the various design constraints in combination. For example, various modified versions of chips size and clock frequency values can be transmitted in combination to separate synthesis and implementation processes. Although some implementation results may report successful implementations with higher clock frequencies, and other implementation results may report successful implementations with smaller chip sizes, a recommended implementation of the digital circuit can be a successful implementation run that maximizes clock frequency and minimizes chips size in combination.

Although the synthesis and implementation processes (e.g., 618) are depicted in FIG. 6 as executing on separate synthesis host computing devices 612-614, in practice some or all of the synthesis and implementation processes can run on a same synthesis host computing device. Furthermore, in some embodiments one or more of the synthesis and implementation processes can execute on the server computer 620 with the flexible constraint implementation controller 630. In at least one embodiment, the separate synthesis host computing devices 612-614 are virtual machines managed by a hypervisor.

Figure 7:
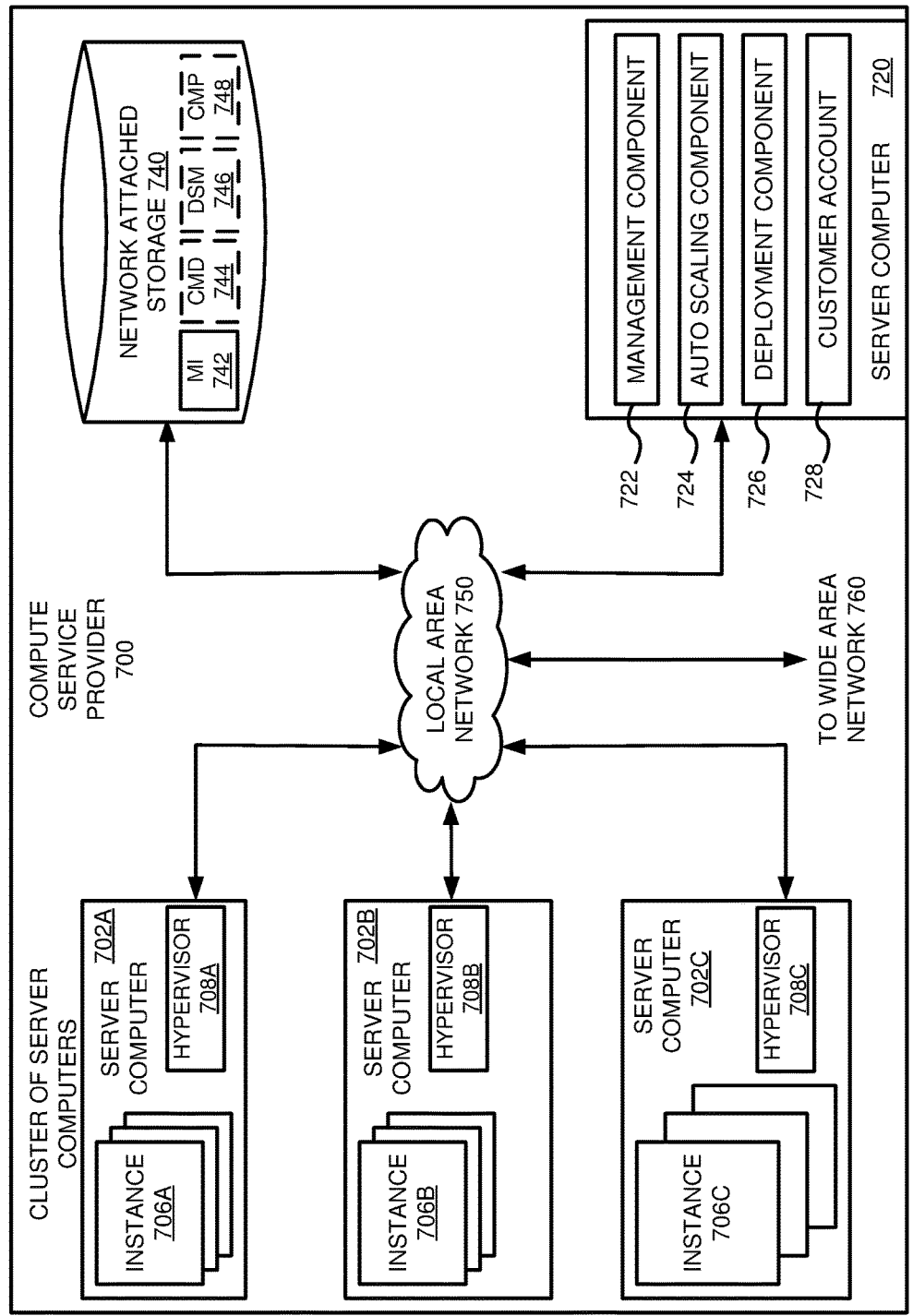
FIG. 7 is system diagram of an example network-based compute service provider that illustrates one environment in which embodiments described herein can be used.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702C. While only three server computers are shown, any number can be used, and large centers can include thousands of server computers. The server computers 702A-702C can provide computing resources for executing software instances 706A-706C. In one embodiment, the software instances 706A-706C are virtual machines. As known in the art, a virtual machine is an instance of a software implementation of a machine (i.e. a computer) that executes applications like a physical machine. In the example of a virtual machine, each of the servers 702A-702C can be configured to execute a hypervisor 708 or another type of program configured to enable the execution of multiple software instances 706 on a single server. Additionally, each of the software instances 706 can be configured to execute one or more applications.

In a different or further embodiment, one or more of the software instances 706A-C are virtualization containers.

It should be appreciated that although the embodiments disclosed herein are described primarily in the context of virtual machines and/or virtualization containers, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances or virtualization containers.

One or more of the server computers 702 and/or instances 706 can be used to execute design implementation controllers, flexible constraint implementation controllers, synthesis and implementation processes, and implementation report analyzers, as described herein.

One or more server computers 720 can be reserved for executing software components for managing the operation of the server computers 702 and the software instances 706. For example, the server computer 720 can execute a management component 722. A customer can access the management component 722 to configure various aspects of the operation of the software instances 706 purchased by the customer. For example, the customer can purchase, rent or lease instances and make changes to the configuration of the software instances. The configuration information for each of the software instances can be stored as a machine image (MI) 742 on the network-attached storage 740. Specifically, the MI 742 describes the information used to launch a VM or virtualization container instance. The MI can include a template for a root volume of the instance (e.g., an OS and applications), launch permissions for controlling which customer accounts can use the MI, and a block device mapping which specifies volumes to attach to the instance when the instance is launched.

The customer can also specify settings regarding how the purchased instances are to be scaled in response to demand. The management component can further include a policy document to implement customer policies. An auto scaling component 724 can scale the instances 706 based upon rules defined by the customer. In one embodiment, the auto scaling component 724 allows a customer to specify scale-up rules for use in determining when new instances should be instantiated and scale-down rules for use in determining when existing instances should be terminated. The auto scaling component 724 can consist of a number of subcomponents executing on different server computers 702 or other computing devices. The auto scaling component 724 can monitor available computing resources over an internal management network and modify resources available based on need.

A deployment component 726 can be used to assist customers in the deployment of new instances 706 of computing resources. The deployment component can have access to account information associated with the instances, such as who is the owner of the account, credit card information, country of the owner, etc. The deployment component 726 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. Such applications can include design implementation controllers, flexible constraint implementation controllers, synthesis and implementation processes, and implementation report analyzers, as described herein. The deployment component 726 can utilize the customer-provided configuration and cache logic to configure, prime, and launch new instances 706. The configuration, cache logic, and other information may be specified by a customer using the management component 722 or by providing this information directly to the deployment component 726. The instance manager can be considered part of the deployment component.

Customer account information 728 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's accessible to the customer, etc.

The network-attached storage (NAS) 740 can be used to provide storage space and access to files stored on the NAS 740. For example, the NAS 740 can include one or more server computers used for processing requests using a network file sharing protocol, such as Network File System (NFS). The NAS 740 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 750. Optionally, the NAS 740 can be used to store constraint modification definitions 744, design source modification definitions 746, and/or constraint modification parameters 748 as described herein.

The network 750 can be utilized to interconnect the server computers 702A-702C, the server computer 720, and the storage 740. The network 750 can be a local area network (LAN) and can be connected to a Wide Area Network (WAN) 760 so that end users can access the compute service provider 700. It should be appreciated that the network topology illustrated in FIG. 7 has been simplified and that many more networks and networking devices can be utilized to interconnect the various computing systems disclosed herein.

Figure 8:
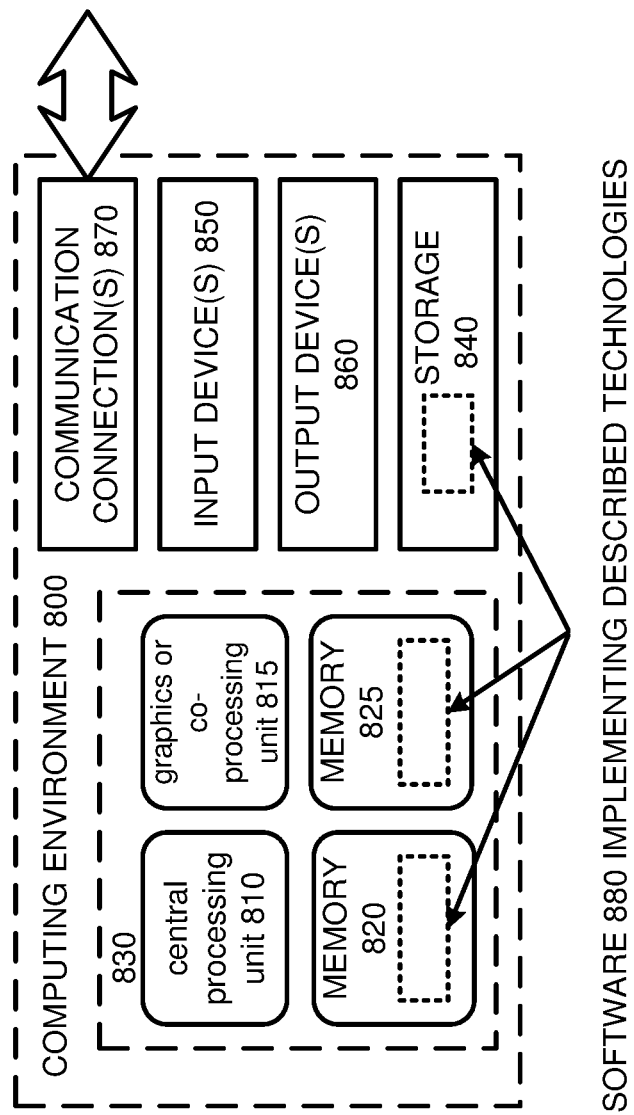
FIG. 8 depicts a generalized example of a suitable computing environment in which some of the described embodiments may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, solid state storage, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system for performing multiple integrated circuit implementation runs, the system comprising:
a circuit design implementation controller configured to:

receive an input circuit definition for a programmable logic device and receive input design implementation constraints,
generate modified versions of the input design implementation constraints, and
transmit the input circuit definition and the modified versions of the input constraints to implementation processes, the implementation processes being distributed across a set of virtual machines;
wherein the implementation processes are configured to:
perform separate circuit implementation runs in parallel using the modified versions of the input constraints and the input circuit definition, and
generate implementation reports corresponding to the separate circuit implementation runs; and
the system further comprising an implementation report analyzer configured to:
receive the implementation reports corresponding to the separate circuit implementation runs, and
generate a circuit implementation recommendation based on the received implementation reports.

2. The system of claim 1, wherein:
the input constraints comprise an input chip size; and
one of the modified versions of the input constraints comprises a chip size that is larger than the input chip size, and wherein another of the modified versions of the input constraints comprises a chip size that is smaller than the input chip size.

3. The system of claim 1, wherein:
the input constraints comprise an input frequency; and
one of the modified versions of the input constraints comprises a frequency that is faster than the input frequency, and wherein another of the modified versions of the input constraints comprises a frequency that is slower than the input frequency.

4. The system of claim 1, wherein the circuit design implementation controller is further configured to:
separate the input circuit definition into circuit definition sub-blocks; and
transmit the circuit definition sub-blocks and the modified versions of the input constraints to the implementation processes.

5. The system of claim 4, wherein the implementation report analyzer is further configured to:
receive additional implementation reports corresponding to implementation runs for the circuit definition sub-blocks; and
wherein generating the circuit implementation recommendation is also based on the received additional implementation reports.

6. The system of claim 1, wherein:
the implementation processes are further configured to generate bitstreams for configuring the programmable logic device using the modified versions of the input constraints and the input circuit definition; and
the circuit implementation recommendation comprises a recommended one of the generated bitstreams.

7. A method, comprising:
receiving a digital circuit design for a programmable logic device and a set of design constraints at a computing device;
generating, by the computing device, sets of adjusted design constraints based on the received set of design constraints;
performing, by the computing device, circuit implementation runs using multiple implementation processes and the generated sets of adjusted design constraints;
aggregating, by the computing device, results of the circuit implementation runs generated by the multiple implementation processes; and
generating, by the computing device, a digital circuit implementation recommendation based on the aggregated results.

8. The method of claim 7, wherein generating the sets of adjusted design constraints comprises:
retrieving constraint modification definitions; and
creating the sets of adjusted design constraints using the constraint modification definitions.

9. The method of claim 7, wherein:
one of the sets of adjusted design constraints comprises a first adjusted design constraint that is created by relaxing one of the design constraints in the set of design constraints; and
another of the sets of adjusted design constraints comprises a second adjusted design constraint that is created by restricting the one of the design constraints in the set of design constraints.

10. The method of claim 7, wherein:
the set of design constraints comprises a target chip size and a target frequency; and
one of the sets of adjusted design constraints is generated by changing the target chip size and changing the target frequency.

11. The method of claim 7, further comprising:
dividing the digital circuit design into circuit design sub-blocks; and
wherein at least some of the multiple implementation runs are performed using different sub-blocks of the circuit design sub-blocks.

12. The method of claim 7, wherein the digital circuit implementation recommendation comprises a recommended netlist for configuring the programmable logic device to implement the digital circuit design.

13. The method of claim 7, wherein:
generating the multiple sets of adjusted design constraints comprises creating multiple versions of the digital circuit design; and
the multiple circuit implementation runs are performed using the multiple versions of the digital circuit design.

14. The method of claim 13, wherein creating the multiple versions of the digital circuit design comprises changing a data path width specified in the digital circuit design.

15. The method of claim 13, wherein creating the multiple versions of the digital circuit design comprises changing a size of a memory specified in the digital circuit design.

16. A system, comprising:
a central processing unit;
a memory; and
a flexible constraint circuit implementation controller configured to:
receive a digital circuit design for a programmable logic device and a design constraint;
retrieve constraint modification parameters;
generate modified versions of the design constraint using the constraint modification parameters;
transmit the digital circuit definition and the modified versions of the design constraint to multiple synthesis and implementation processes;
receive implementation results from the multiple synthesis and implementation processes; and analyze the implementation results to determine a recommended implementation of the digital circuit design.

17. The system of claim 16, wherein:
the multiple synthesis and implementation processes are running on separate host computing devices.

18. The system of claim 16, wherein the multiple synthesis and implementation processes are executed in parallel.

19. The system of claim 16, wherein analyzing the implementation results to determine a recommended implementation of the digital circuit design comprises:
correlating the implementation results with the modified versions of the design constraint; and
identifying a design constraint boundary condition by detecting that an error occurs in one of the implementation results and does not occur in another of the implementation results.

20. The system of claim 16, wherein the flexible constraint implementation controller is further configured to:
receive other design constraints in addition to the design constraint; and
transmit the other design constraints to the multiple synthesis and implementation processes with the modified versions of the design constraint.

* * * * *